Patented July 10, 1928.

1,676,988

UNITED STATES PATENT OFFICE.

COLIN C. MARYAN, OF LAWRENCE PARK, PENNSYLVANIA, ASSIGNOR TO GENERAL ELECTRIC COMPANY, A CORPORATION OF NEW YORK.

FLUX FOR WELDING CAST IRON.

No Drawing.  Application filed December 8, 1925. Serial No. 74,170.

My invention relates to fluxes for fusion welding and more particularly for cast iron welding.

An object of my invention is to produce a flux which will insure the production of a uniform weld free from slag and other impurities.

A further object of my invention is to provide a flux which will be simple and inexpensive to produce and easy to use.

The ingredients of my welding flux in its preferred form comprise ferric carbonate, ammonium chloride, sodium borate, sodium bicarbonate and sodium chloride. The proportions of these ingredients are preferably approximately as follows:

| | Parts. |
|---|---|
| Ferric carbonate | 4 |
| Ammonium chloride | 12 |
| Sodium borate | 16 |
| Sodium bicarbonate | 20 |
| Sodium chloride | 12 |

The ingredients above mentioned in powdered form may be dusted on the work piece during the welding operation. If desired, however, the ingredients may be applied in the form of a paste to a welding rod or electrode as a coating, a suitable binder being used, or the flux may be enclosed in the welding rod or electrode in any suitable way, examples of which are well known in the art.

What I claim as new and desire to secure by Letters Patent of the United States, is,—

A flux for welding cast iron comprising substantially ferric carbonate 4 parts, ammonium chloride 12 parts, sodium borate 16 parts, sodium bicarbonate 20 parts and sodium chloride 12 parts.

In witness whereof, I have hereunto set my hand this 5th day of December, 1925.

COLIN C. MARYAN.